United States Patent

Rehm et al.

[11] Patent Number: 5,909,371
[45] Date of Patent: Jun. 1, 1999

[54] PROCESS OF OPERATING A NUMERICAL CONTROL WITH CRITICAL-TIME AND NON-CRITICAL-TIME PROCESSES IN A REAL TIME SYSTEM

[75] Inventors: Thomas Rehm, Erlangen; Josef Willert, Hessdorf, both of Germany

[73] Assignee: Siemens Aktiengesellschaft, Munich, Germany

[21] Appl. No.: 08/945,489

[22] PCT Filed: Apr. 9, 1996

[86] PCT No.: PCT/DE96/00619

§ 371 Date: Feb. 2, 1998

§ 102(e) Date: Feb. 2, 1998

[87] PCT Pub. No.: WO96/33450

PCT Pub. Date: Oct. 24, 1996

[30] Foreign Application Priority Data

Apr. 19, 1995 [DE] Germany .................... 195 14 471

[51] Int. Cl.⁶ .................................. G06F 19/00
[52] U.S. Cl. .................. 364/167.02; 364/474.11; 395/670; 395/737
[58] Field of Search .................. 364/167.02, 131, 364/132, 133, 140.02, 140.03, 474.11, 474.15; 395/670–678, 288, 297, 304, 827, 865, 200.55, 200.56, 733–742

[56] References Cited

U.S. PATENT DOCUMENTS

| | | |
|---|---|---|
| 4,118,771 | 10/1978 | Pomella et al. .................... 364/134 |
| 4,638,452 | 1/1987 | Schultz et al. .................... 364/141 |
| 5,235,508 | 8/1993 | Urov et al. .................. 364/474.13 X |
| 5,473,757 | 12/1995 | Sexton .................... 364/131 |
| 5,537,549 | 7/1996 | Gee et al. .................... 395/865 X |
| 5,568,617 | 10/1996 | Kametani .................. 364/132 X |

FOREIGN PATENT DOCUMENTS 0 636 956  2/1995  European Pat. Off. .

*Primary Examiner*—Joseph Ruggiero
*Attorney, Agent, or Firm*—Kenyon & Kenyon

[57] ABSTRACT

In a real-time system of a digital control system, in order to prevent a single program sequence (PS2) of a non-time-critical computing process ("task") from using up a load-dependently disproportionate amount of the total computing time still available, the program sequence (PS2) is classified as a subordinate computing process (R14) that has a running-time limit (LZF). Sequences of program steps that are preferably not to be interrupted are in this case protected from interruption by a lock, the original running-time limit (LZG) being able to be run over only within predetermined limits.

4 Claims, 3 Drawing Sheets

PROCESS OF OPERATING A NUMERICAL CONTROL WITH CRITICAL-TIME AND NON-CRITICAL-TIME PROCESSES IN A REAL TIME SYSTEM

FIELD OF THE INVENTION

The present invention relates to a method of operating a numerical control system having a real-time system, in particular for machine tools and robots, the real-time system having time-critical computing processes and non-time-critical computing processes each having at least one program sequence comprising sequences of program steps to be processed.

BACKGROUND INFORMATION

In the case of a digital control system, in particular of a numerical control system for machine tools or robots, there are cyclically repeating time-critical computing processes. The processes comprise, for example, the continuous output, necessary for controlling the position and rotational speed, of desired values to the drives of the machine tool or of the robot. The processes also include the continuous acquisition of the position and speed transmitter values.

Other tasks of such a control system, such as the updating of the indicating unit, polling the keyboard of the input unit, reading in future partial programs, the preparation of NC data as a function of the partial programs, etc., are by contrast to be seen as non-time-critical computing processes. Computing processes may also be referred to as "tasks".

The real-time system of the control system must ensure that the time-critical computing processes are always processed immediately. To this end, as required a non-time-critical computing process which is currently being processed is interrupted. The measures necessary for this, for example processor interrupts, are known to those skilled in the art.

The real-time system must also ensure that the non-time-critical computing processes processed in the computing time that is still available between the processing of the time-critical computing processes. During the processing of these non-time-critical computing processes it has to be taken into account that all the non-time-critical computing processes are processed as far as possible simultaneously in accordance with the "time-sharing" method.

Each computing process comprises one or more program sequences which in turn comprise a sequence of individual program steps to be processed. Some of these program sequences are very load-dependent. Thus a computing process which loads an NC partial program into the memory of the real-time system needs significantly more computing time for a large complex partial program than for a small simple partial program.

This dependence on load means that the computing time needed for individual program sequences fluctuates severely and under certain circumstances becomes disproportionately large in comparison to other program sequences, The problem thus arises that an individual program sequence uses up the entire computing time still available between the processing of the time-critical computing processes, and therefore the other program sequences, for example the screen display, cannot for the time being be processed further. A behavior resulting from this of the control system could disquiet the user or lead to erroneous action.

A previous solution comprised subdividing such program sequences into a multiplicity of independent computing processes. However, such a solution had the disadvantage that additional computing time is used in the real-time system for the administration of these additional computing processes. Even in cases where, for load-dependent reasons, the program sequence is currently not disproportionately large. Furthermore, program sequences of this type cannot always be localized in advance. Often, such program sequences are specifically ascertained only when adapting the control systems to specific customer requirements. However, subsequent changes of the computing process structure to the customer requirements would then be extremely complicated. If in addition it is truly possible only at running time to detect whether a program sequence needs a disproportionately large amount of computing time, a dynamic change to the computing process structure would have to be undertaken. This would likewise require computing time to a high extent, and because of the increased complexity, interventions in the running process would be undesirable for reasons of safety.

SUMMARY OF THE INVENTION

The present invention provides a method of operating a real-time system wherein severely load-dependent, non-time-critical program sequences can be prevented in a simple way from using up the whole of the computing time still available between the processing of the time-critical computing processes. The approach of the present invention is to limit the running time of such program sequences.

According to the invention, this object is achieved in that in order to limit the running time of a program sequence of a non-time-critical computing process, the program sequence is classified as a computing process that is subordinate to the computing process and has a running-time limit value and is processed accordingly, in that the subordinate computing process, before beginning sequences of program steps that are preferably not to be interrupted within its program sequence, sets a lock assigned to it and, after processing such sequences of program steps, once more cancels the lock assigned to it, in that after the time period corresponding to the running-time limit value has elapsed the subordinate computing process is interrupted in order to process other pending, non-time-critical computing processes, providing no lock assigned to the subordinate computing process is set, in that after a greater time period that can be derived from the running-time limit value has elapsed, the subordinate computing process is interrupted in order to process other pending, non-time-critical computing processes, irrespective of whether or not a lock assigned to the subordinate computing process is set, in that, in the event of cancelling the lock assigned to it in the time interval between the time period predefined by the running-time limit value and the greater time period that can be derived from the running-time limit value, the subordinate computing process is interrupted immediately in order to process other pending non-time-critical computing processes, in that the subordinate computing process, like any other non-time-critical computing process, is always immediately interrupted by a pending time-critical computing process.

By limiting the running time of a non-time-critical program sequence, it is ensured that the real-time system can interrupt the program sequence at the latest after a predefinable time period has elapsed, in order to be able to further process other non-time-critical computing processes. This ensures that a program sequence which is expensive in terms of computing time cannot hold up other non-time-critical computing processes for longer than a predefinable time period.

The conversion according to the present invention of the running-time limit by means of a subordinate computing process with the setting of a lock needs no complicated administration, is suitable for program sequences which cannot always be localized in advance and can also be undertaken during the running time, without increasing the complexity of the system.

An advantageous development of the present invention comprises the subordinate computing process transmitting to the original computing process a feedback message as to whether it has itself terminated after processing or whether it was interrupted on account of its running-time limit. This has the advantage that, for example, with the next activation the running-time limit can be redefined once more. It is therefore still easy to undertake optimization of the computing-time distribution, even at running time.

DETAILED DESCRIPTION OF THE INVENTION

Figure 1:
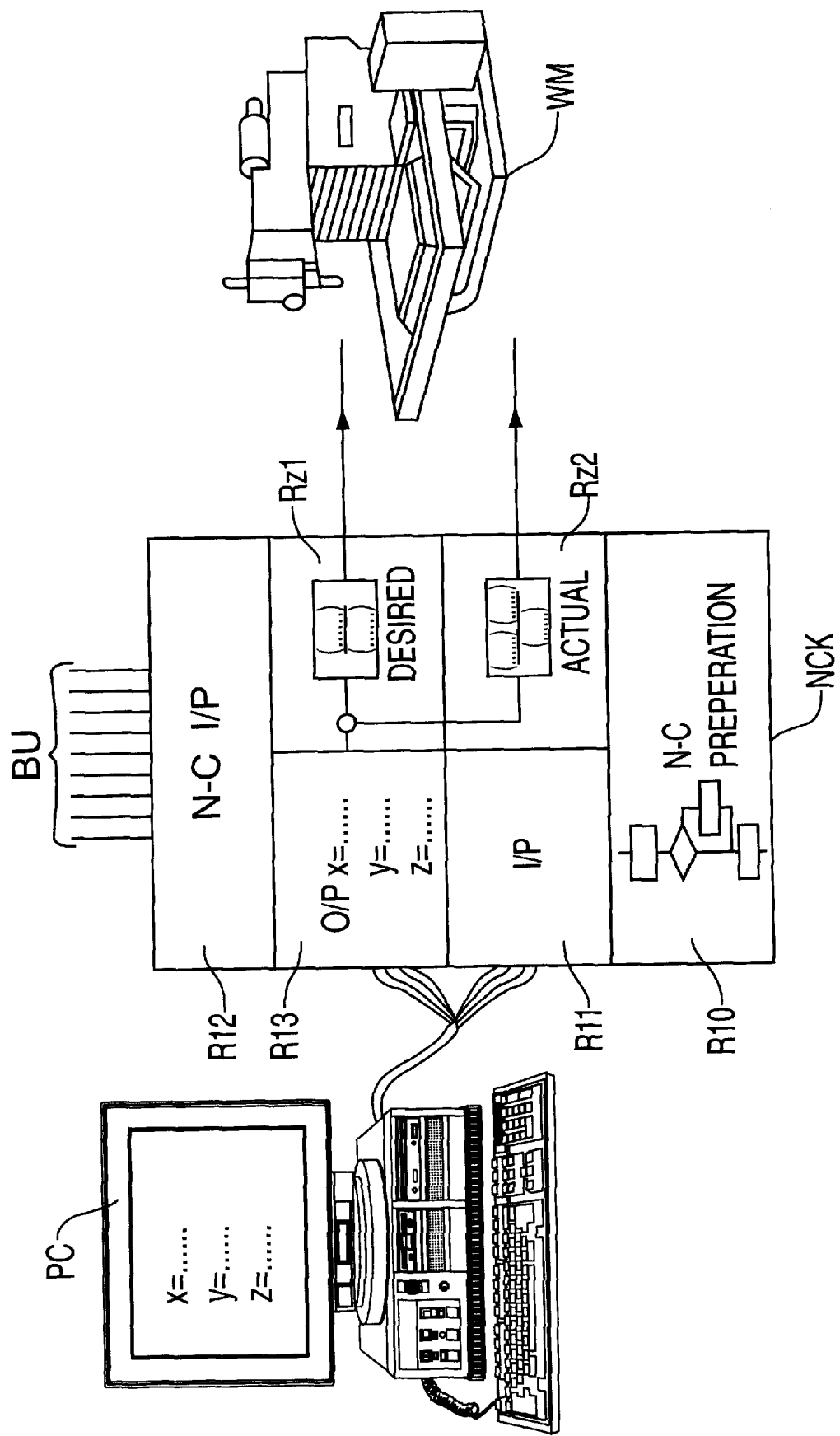
FIG. 1 shows a block illustration of a numerical control system, based on a real-time system, for example, working together with a machine tool.

FIG. 1 shows a block illustration of a numerical control system based on a real-time system NCK. The real-time system NCK is connected to a machine tool WM, to an input and output unit PC and an information bus BU. A plurality of computing processes are depicted as rectangles Rz1, Rz2, R10, R11, R12, R13 in the real-time system NCK. In this case, the computing processes Rz1 and Rz2 are responsible for the regular and time-critical output of desired values to the drives of the machine tool WM, and the likewise regular and time-critical acquisition of the position and speed transmitter values. Other computing processes are responsible for updating the indicating unit (computing process R13), the polling of the keyboard of the input unit (computing process R11), the reading in of partial programs (computing process R12) and the preparation of NC data on the basis of the partial programs (computing process R10), and are accordingly not time-critical.

Figure 2:
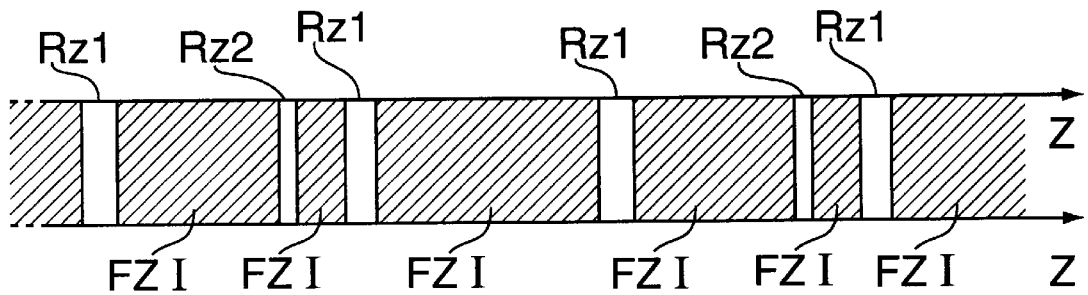
FIG. 2 shows the computing-time division between time-critical computing processes and non-time-critical computing processes.

FIG. 2 shows a horizontal bar diagram in which the time increases along the horizontal axis in the direction of the reference arrow. The available computing time of the control system is subdivided into individual sections, in which only a single computing process is ever processed at one time. The sections identified by Rz1 correspond to a cyclically repeating time-critical computing process which, for example, is responsible for the position control of an axis on the machine tool. The sections identified by Rz2 correspond to a second cyclically repeating time-critical computing process which, for example, is responsible for the speed control of a further axis on the machine tool. In order to simplify the illustration, only two time-critical computing processes Rz1 and Rz2 are shown. The processing of all non-time-critical computing processes must be accommodated in the time intervals FZI between the processing of the time-critical computing processes.

Figure 3A:
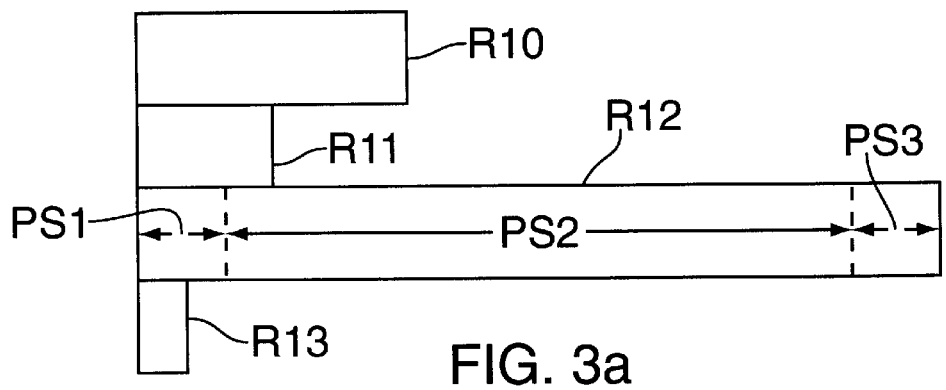
FIG. 3a shows a symbolic illustration of four non-time-critical computing processes without the application of the method according to the present invention.

In FIG. 3a, by way of example, four non-time-critical computing processes R10, R11, R12, R13 are illustrated symbolically as bars. The length of the bars corresponds to the relative computing time which is needed for the complete processing of the respective process. Thus, the computing process R13 needs the least computing time and the computing process R12 needs the most by some way.

The real-time system selects, in accordance with methods known to those skilled in the art, one of the non-time-critical computing processes R10, R11, R12, R13 and processes this in the still free time periods FZI between the processing of the cyclically repeating time-critical computing processes Rz1 and Rz2.

Each computing process comprises at least one program sequence comprising sequences of program steps to be processed. For example, the computing process R12 comprises the three program sequences PS1, PS2 and PS3, the program sequence PS2, for example, depending on the load, being assumed to be disproportionately large in comparison with the other program sequences PS1 and PS3, or needing a disproportionately large amount of computing time. In order to simplify the illustration, the program sequences of the other computing processes are not shown in FIG. 3a.

If the real-time system selects the computing process R12 in order to process it in the time intervals FZI, the problem then arises that a signal program sequence such as PS2 uses up for a long time the entire computing time FZI still available, and all the other program sequences of the non-time-critical computing processes R10, R11, R13 remain at a standstill for the time being.

Figure 3B:
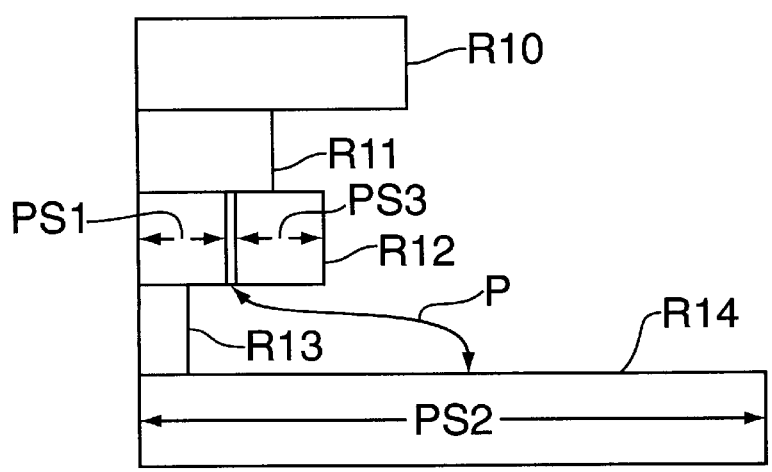
FIG. 3b shows a symbolic illustration of non-time-critical computing processes when using the method of the present invention.

To prevent this, according to the present invention a non-time-critical program sequence like PS2 is provided with a running-time limit. The real-time system can then interrupt the program sequence PS2, in order to process one of the other non-time-critical computing processes R10, R11, R13 further. As shown in FIG. 3b, to this end the program sequence PS2 is classified as a computing process R14 subordinate to the computing process R12 (see arrow P), and is provided in the real-time system with a running-time limit value LZG.

Figure 4:
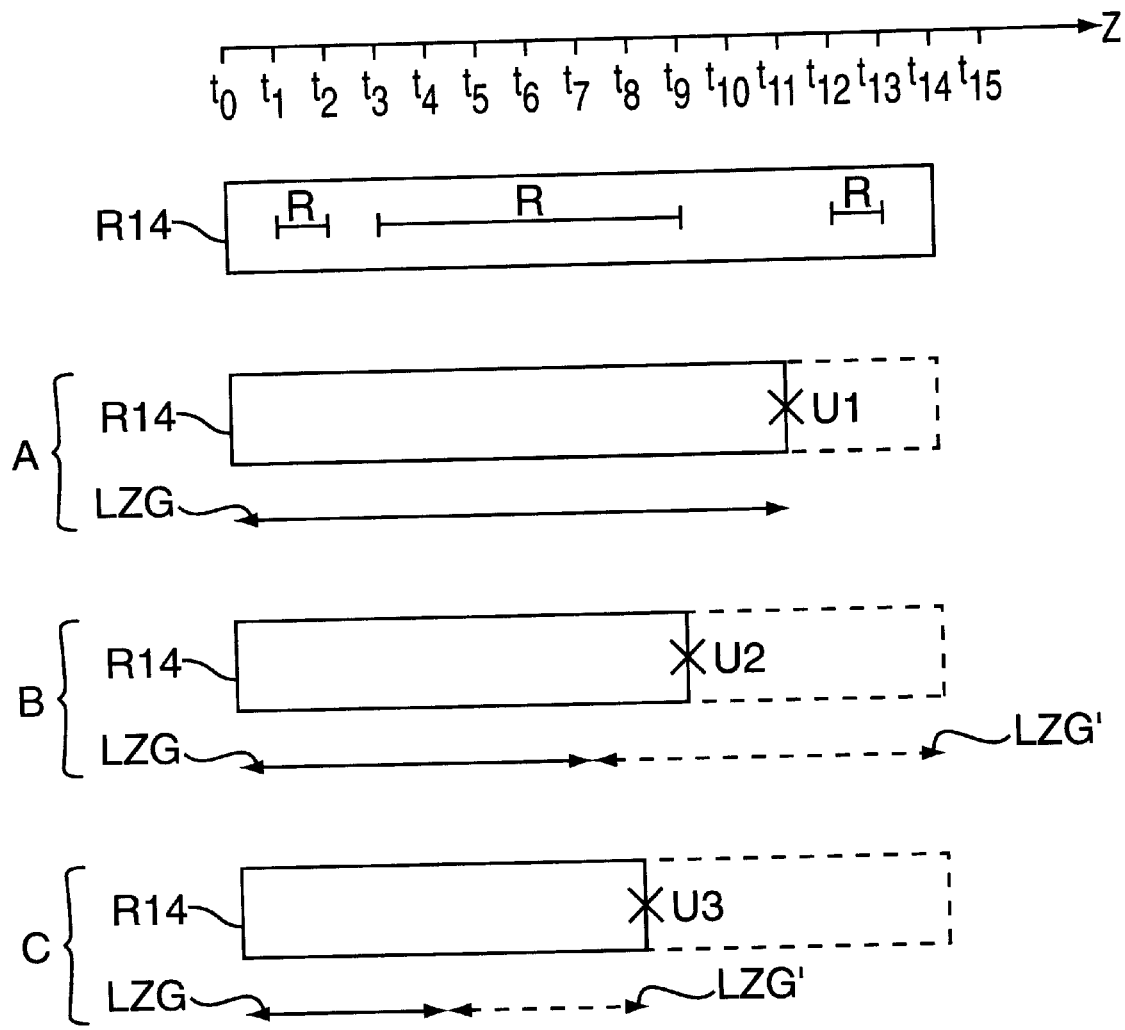
FIG. 4 shows a symbolic illustration of a subordinate computing process in the case of different running-time limit values.

FIG. 4 shows symbolically how the subordinate computing process R14 is processed. The time Z is shown in FIG. 4 as a horizontal axis with times t0, t1, etc. up to t15. Underneath this, the bar R14 from t0 to t14 symbolizes the running-time-limited subordinate computing process R14.

In the interior of the bar R14, the time sections t1 to t2, t3 to t9 and t12 to t13 are identified by R and represent those sequences of program steps within the program sequence PS2 which should preferably not be interrupted. In the case of a computing process which transmits data in packets, the transmission of one data packet would, for example, correspond to such a sequence of program steps that is not to be interrupted. If the process is interrupted in the middle of the transmission of a data packet, then the entire packet must be transmitted once more at a later time, which is less efficient.

On the other hand, if the interruption takes place only after a packet has been completed, then the transmission of the next data packet can be continued at a later time without loss of efficiency.

According to the present invention, before beginning sequences of program steps which are preferably not to be interrupted within the program sequence PS2, a lock R assigned to the computing process R14, is set (at the times t1, t3 and t12 in the exemplary embodiment), and after the processing of such sequences of program steps the lock R is cancelled once more (at the times t2, t9 and t13 in the exemplary embodiment). In FIG. 4, the sections identified by R in the interior of the bar R14 correspond to the time sections t1 to t2, t3 to t9 and t12 to t13 where the lock for the computing process R14 was set.

The method by which the running-time-limited computing process R14 is interrupted by the real-time system after its running-time limit LZG has elapsed, then depends on whether or not the lock R is set at this time. Several cases have to be distinguished.

In the simplest case, the computing process R14 can be processed completely within its running-time limit LZG and therefore does not differ further from the other computing processes, and, thus, such a case will not be described further.

All the other cases are illustrated in FIG. 4, in the sections A, B and C respectively.

In section A of FIG. 4, the running-time limit LZG is depicted as a horizontal double arrow underneath the bar R14 for the computing process R14. In this case, the running-time limit LZG ends at the time t11, at which the lock R is still in the not-set state. The computing process R14 is then interrupted at the time t11, which is identified by the cross U1.

In section B of FIG. 4, the running-time limit LZG is depicted as a horizontal double arrow underneath the bar R14 for the computing process R14. There is a further dashed double arrow LZG' of equal length, which represents a doubling of the originally predefined running-time limit LZG. In this case, the original running-time limit LZG ends at the time t7, at which the lock R is still in the set state. The computing process R14 is then not interrupted at the time t7. Instead, it is permitted a prolongation of the running-time limit, which prolongation, for example, comprises a doubling of the original predefined running-time limit of LZG to LZG+LZG'. The greater running-time limit time period LZG+LZG', which can also be derived in any other way from the running-time limit LZG, would come to an end only at the time t14. The sequence of program steps which is preferably not to be interrupted has already ended, however, at the earlier time t9. Accordingly, the computing process R14 cancels the lock R at time t9. The real-time system then interrupts the computing process R14, which has already gone over its original running-time limit LZG, immediately at the time t9, which is identified by the cross U2.

In section C of FIG. 4, the running-time limit LZG is depicted as a horizontal double arrow underneath the bar R14 for the computing process R14. There is a further dashed double arrow LZG' of equal length, which represents a doubling of the originally predefined running-time limit LZG. In this case, the original running-time limit LZG ends at the time t4, at which the lock R is in the set state. The computing process R14 is then not interrupted at the time t4. Instead, it is permitted a prolongation of the running-time limit, which prolongation, for example, comprises a doubling of the original predefined running-time limit of LZG to LZG+LZG'. This greater running-time limit time period LZG+LZG', which can also be derived in any other way from the running-time limit LZG, is only terminated at the time t8. The sequence of program steps which is preferably not to be interrupted is, however, still not at an end at this time. Nevertheless, the real-time system interrupts the computing process R14, which has already run over its original running-time limit LZG, at the time t8, which is identified by the cross U3.

In this arrangement, a corresponding feedback message can be transmitted in every case to the higher-order computing process R12, so that the latter, at the next activation, can undertake any possible optimization of the running-time limit LZG.

What is claimed is:

1. A method for operating a numerical control system having a real-time system, the real-time system having time-critical computing processes and non-time-critical computing processes, each of the computing processes having at least one program sequence, the method comprising the steps of:

(a) classifying a program sequence of a non-time-critical computing process as a subordinate computing process to limit a running time of the program sequence, the subordinate computing process being subordinate to the respective non-time-critical computing process and having a running-time limit value associated therewith;

(b) setting a lock indicator assigned to the subordinate computing process before starting a sequence of program steps;

(c) after processing the sequence of program steps, canceling the lock indicator assigned to the subordinate computing process;

(d) after a time period corresponding to the running-time limit value elapses, interrupting the subordinate computing process to process at least another non-time-critical computing process that is pending if the lock indicator assigned to the subordinate computing process is not set;

(e) after a further time period greater than the running-time limit value elapses, interrupting the subordinate computing process to process another of the non-time-critical computing processes that is pending;

(f) interrupting the subordinate computing process to process another of the non-time-critical computing processes that is pending if the lock indicator assigned to the subordinate computing process is reset in a time interval between the running-time limit value and the further time period; and (g) interrupting any non-time-critical computing process if a time-critical computing process is pending.

2. The method according to claim 1, wherein the subordinate computing process transmits a feedback message to the respective non-time-critical computing process, the feedback message indicating whether the subordinate computing process was terminated after processing or interrupted because the running-time limit value was exceeded.

3. The method according to claim 1, wherein the real-time system includes one of a machine tool and a robot.

4. The method according to claim 1, wherein the sequence of program steps is not interruptible.

* * * * *